US008090144B2

(12) United States Patent
Chang et al.

(10) Patent No.: US 8,090,144 B2
(45) Date of Patent: Jan. 3, 2012

(54) SYSTEM AND METHOD FOR ADJUSTING LUMINANCE OF A LIGHT-EMITTING DEVICE ON AN IMAGE MEASURING MACHINE

(75) Inventors: Chih-Kuang Chang, Taipei Hsien (TW); Xian-Yi Chen, Shenzhen (CN); Zhong-Kui Yuan, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 719 days.

(21) Appl. No.: 12/264,915

(22) Filed: Nov. 5, 2008

(65) Prior Publication Data

US 2009/0123033 A1    May 14, 2009

(30) Foreign Application Priority Data

Nov. 14, 2007    (CN) .......................... 2007 1 0202538

(51) Int. Cl.
*G06K 9/00*    (2006.01)

(52) U.S. Cl. ......... 382/100; 382/103; 382/151; 382/172
(58) Field of Classification Search .................. None
See application file for complete search history.

(56) References Cited

U.S. PATENT DOCUMENTS

| 5,091,963 | A | * | 2/1992 | Litt et al. ...................... 382/149 |
| 6,590,643 | B2 | * | 7/2003 | Kubota et al. ................. 356/121 |
| 7,545,512 | B2 | * | 6/2009 | Kim et al. ..................... 356/514 |

* cited by examiner

*Primary Examiner* — Tom Y Lu
*Assistant Examiner* — Thomas Conway
(74) *Attorney, Agent, or Firm* — Altis Law Group, Inc.

(57) ABSTRACT

A computer-based method for adjusting luminance of a light-emitting device on image measuring machine is provided. The method includes reading a model definition curve and model coordinates of an object and a charge couple device (CCD). The method further includes locating the object and the CCD to positions on the image measuring machine, and capturing a digital image of the object. Furthermore, the method includes adjusting a resistance of the light-emitting device to ensure an ordinate deviation corresponding to each abscissa value between a new definition curve and the model definition curve falls in an allowable deviation range. A related system is also provided.

17 Claims, 6 Drawing Sheets

FIG. 6

SYSTEM AND METHOD FOR ADJUSTING LUMINANCE OF A LIGHT-EMITTING DEVICE ON AN IMAGE MEASURING MACHINE

BACKGROUND

1. Field of the Invention

Embodiments of the present disclosure relate to the field of image measurement, and more particularly to a system and method for adjusting luminance of a light-emitting device on an image measuring machine.

2. Description of Related Art

In the precision measurement field, a charge coupled device (CCD) installed on an image measuring machine can capture a digital image of an object by focusing on the object via a lens module. However, due to some factors, for example, characteristics of light-emitting device, the digital images captured by the CCD have sharp deviation. If the image is magnified, the image may be deformed.

What is needed, therefore, is an improved system and method which can adjust the light-emitting device, in order to enhance efficiency and convenience.

SUMMARY

In one aspect, a system for adjusting luminance of a light-emitting device on an image measuring machine is provided. The system comprises a reading module, a position determining module, a driving module, a computing module, a deviation determining module and an adjusting module. The reading module is configured for reading a model definition curve chart of the light-emitting device, the model definition curve chart comprising a coordinate system containing a model definition curve, and model coordinates of an object and a charge coupled device (CCD) on the image measuring machine. The position determining module is configured for determining positions of the object and the CCD on the image measuring machine according to the model coordinates of the object and the CCD, so as to locate the object and the CCD to positions on the image measuring machine. The driving module is configured for driving the light-emitting device to emit light, and controlling the CCD to capture a digital image of the object of at each luminance value of the light-emitting device. The computing module is configured for computing a definition value for each captured digital image and generating a new definition curve in the model definition curve chart according to the computed definition values. The deviation determining module is configured for determining if an ordinate deviation corresponding to each abscissa value between the new definition curve and the model definition curve in the model definition curve chart falls in an allowable deviation range. The adjusting module is configured for adjusting a resistance of the light-emitting device to ensure the ordinate deviation falls in the allowable deviation range. At least one processor executes the reading module, the position determining module, the driving module, the computing module, the deviation determining module and the adjusting module.

Other advantages and novel features will become more apparent from the following detailed description of certain embodiments of the present disclosure when taken in conjunction with the accompanying drawings.

DETAILED DESCRIPTION OF CERTAIN INVENTIVE EMBODIMENTS

All of the processes described below may be embodied in, and fully automated via, function modules executed by one or more general purpose computers or processors. The code modules may be stored in any type of computer-readable medium or other computer storage device. Some or all of the methods may alternatively be embodied in specialized computer hardware.

Figure 1:
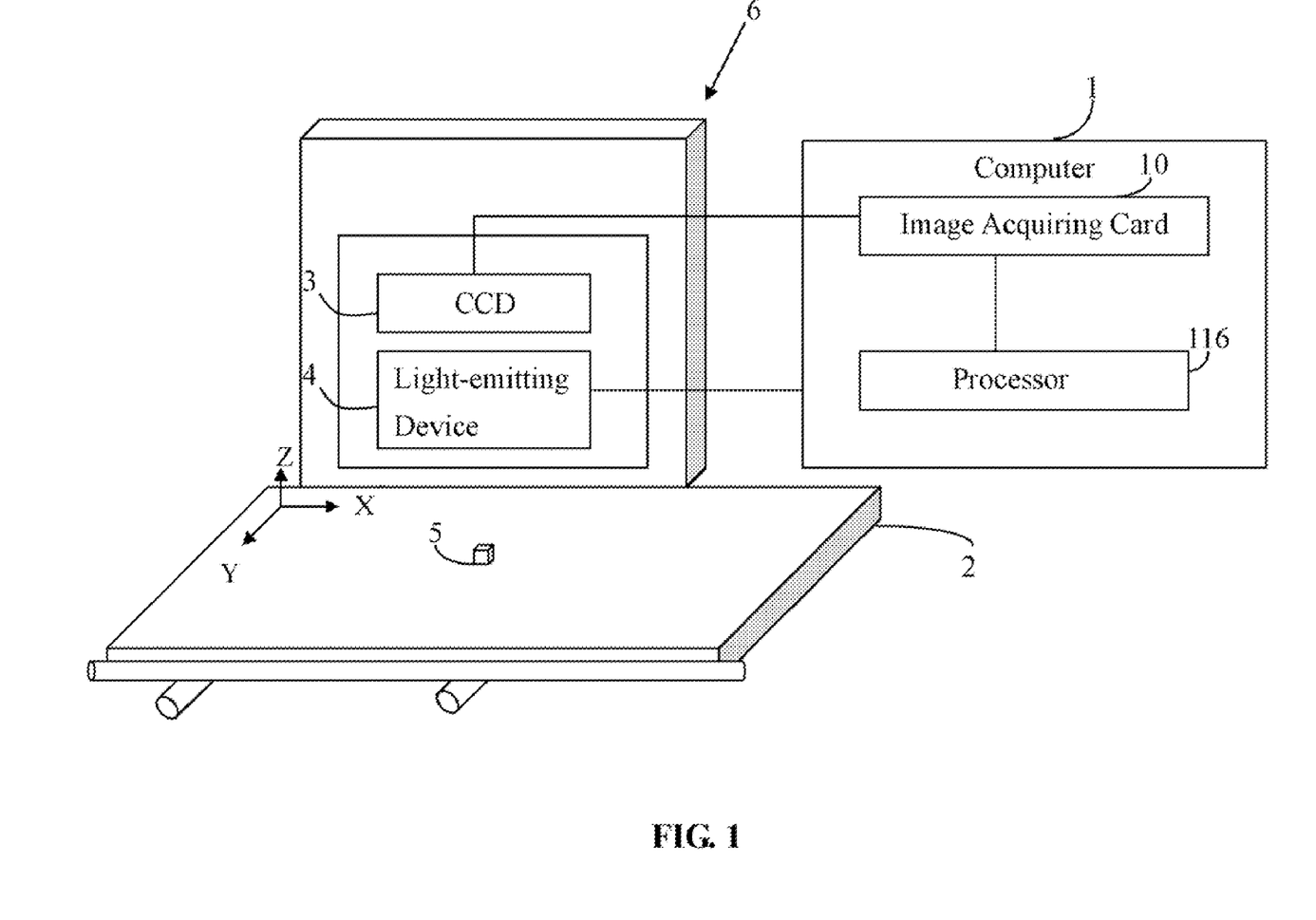
FIG. 1 is a block diagram of one embodiment of a system for adjusting luminance of a light-emitting device on an image measuring machine.

FIG. 1 is a block diagram of one embodiment of a system 6 for adjusting luminance of a light-emitting device 4 of an image measuring machine 2. In one embodiment, the system 6 comprises a computer 1 and the image measuring machine 2 connected to the computer 1. The computer 1 may comprise a plurality of peripherals and devices such as a monitor (not shown) electronically connected to the computer 1. An object 5 is located on an object receiving platform of the image measuring machine 2. A charge coupled device (CCD) 3 is movable along a Z-axis of the image measuring machine 2, and is used for capturing a digital image of the object 5. The light-emitting device 4 may be positioned on the Z-axis of the image measuring machine 2, and is used for emitting light. In one embodiment, the light-emitting device 4 is a laser.

The computer 1 may comprise an image acquiring card 10. The CCD 3 is electronically connected with the image acquiring card 10, and is configured for transferring the digital image to the computer 1 through the image acquiring card 10.

Figure 2:
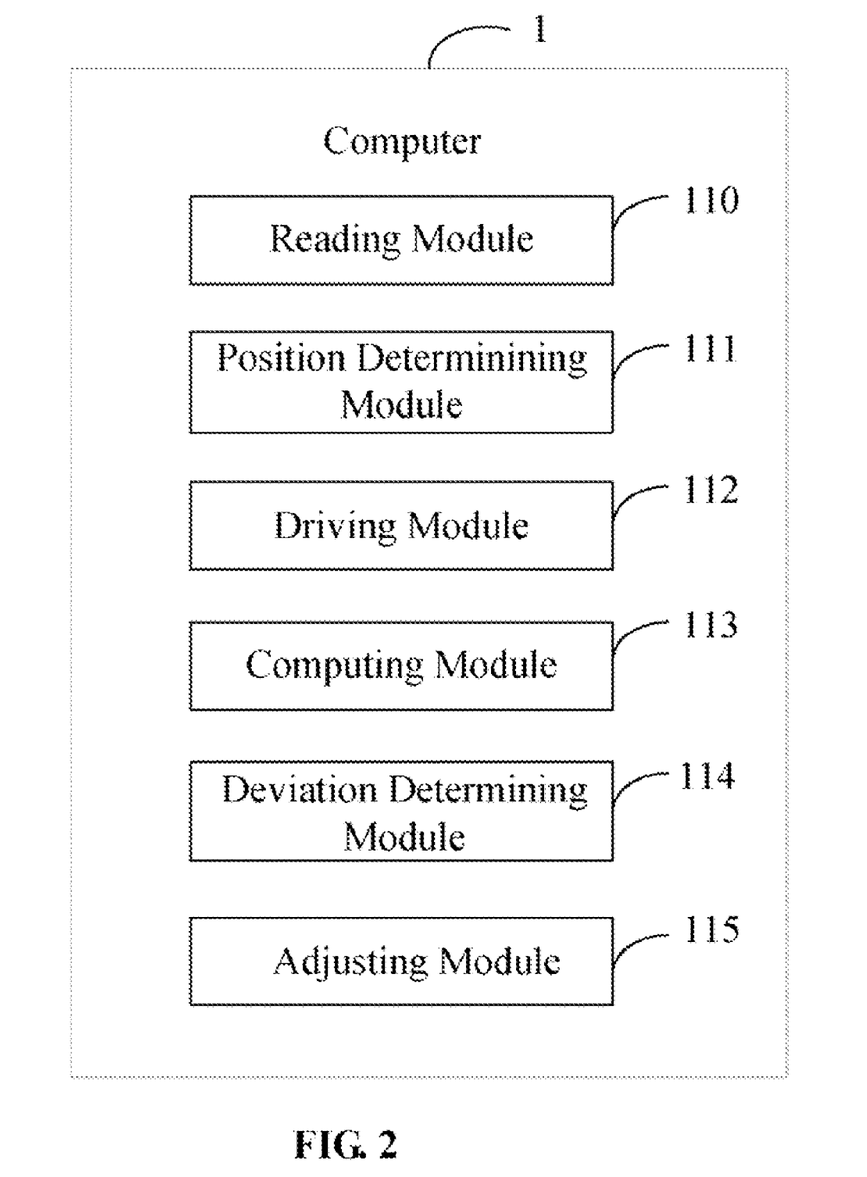
FIG. 2 is a block diagram of one embodiment of a computer in FIG. 1.

FIG. 2 is a block diagram of one embodiment of the computer 1. In one embodiment, the computer 1 comprises a reading module 110, a position determining module 111, a driving module 112, a computing module 113, a deviation determining module 114, and an adjusting module 115. The modules 110, 111, 112, 113, 114, 115 may be used to execute one or more operations of the computer 2. A processor 116 may be used to execute one or more operations of the modules 110, 111, 112, 113, 114, 115.

Figure 4:
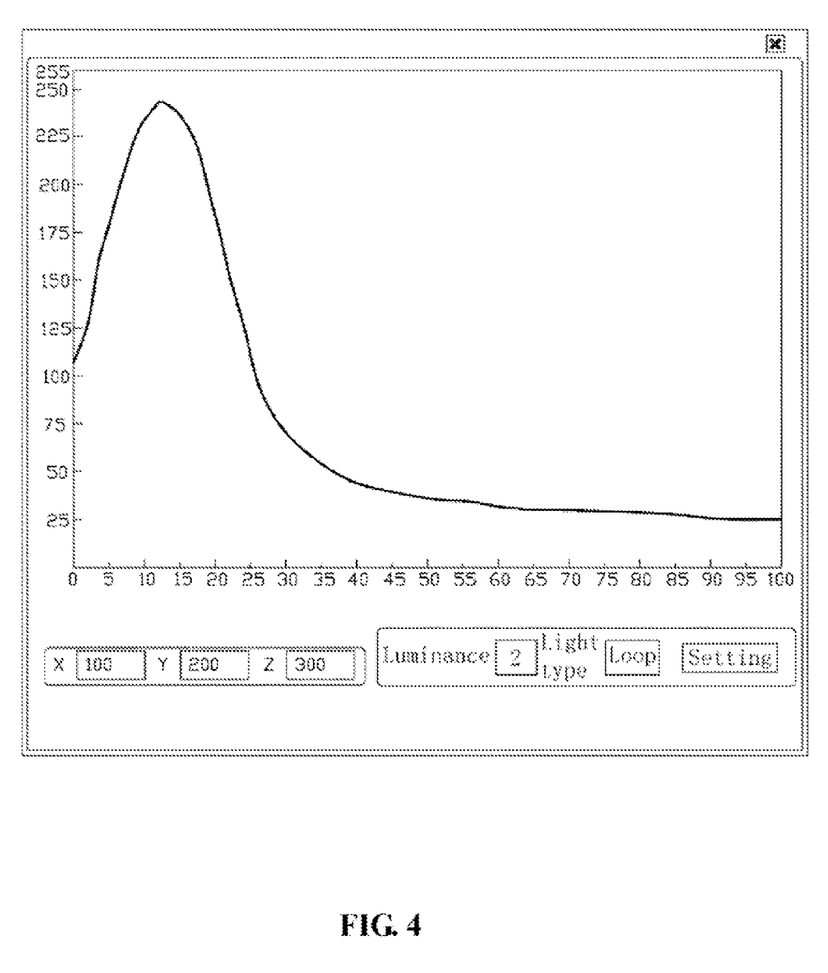
FIG. 4 illustrates one embodiment of a model definition curve chart which includes a model definition curve.

The reading module 110 is configured for reading a model definition curve chart of the light-emitting device 4, and displaying the model definition curve chart on the monitor (not shown in FIG. 1) of the computer 1. As shown in FIG. 4, the model definition curve chart comprises a coordinate system and model coordinates of the object 5 and the CCD 3 on the image measuring machine 2. The coordinate system contains a model definition curve. In one embodiment, the ordinate of the coordinate system in the model definition curve chart indicates the definition of digital image of the object 5, and the abscissa of the coordinate system in the model definition curve chart indicates the luminance of the light-emitting device 4. The model coordinates on X-axis, Y-axis, or Z-axis indicate the position of the object 5 and the CCD 3 on the image measuring machine 2, and are shown on the model definition curve chart (referring to FIG. 4). In one embodiment, the model coordinates of the object 5 and the CCD 3 on X-axis and Y-axis are the same. In other words, the object 5 is located on the object receiving platform of the image measuring machine 2 (referring to FIG. 1), the model coordinate of the object 5 on Z-axis is fixed and not shown in the model definition curve chart. For example, if the model coordinates on the model definition curve chart are (100,200,300), then the model coordinates of CCD 3 are (100,200,300), the model coordinates of the object 5 are (100,200,500). If the model coordinates on the model definition curve chart are (400,600,700), then the model coordinates of CCD 3 are (400,600,700), the model coordinates of the object 5 are (400,600,500).

The position determining module 111 is configured for determining positions of the object 5 and the CCD 3 on the image measuring machine 2 according to the model coordinates of the object 5 and the CCD 3. In one embodiment, for example, if the model coordinates of object 5 are (400,600,500), then the object 5 is located to a position whose model coordinates are (400,600,500), if the model coordinates of CCD 3 are (400,600,700), then the CCD 3 is located to a position whose model coordinates are (400,600,700).

Figure 5:
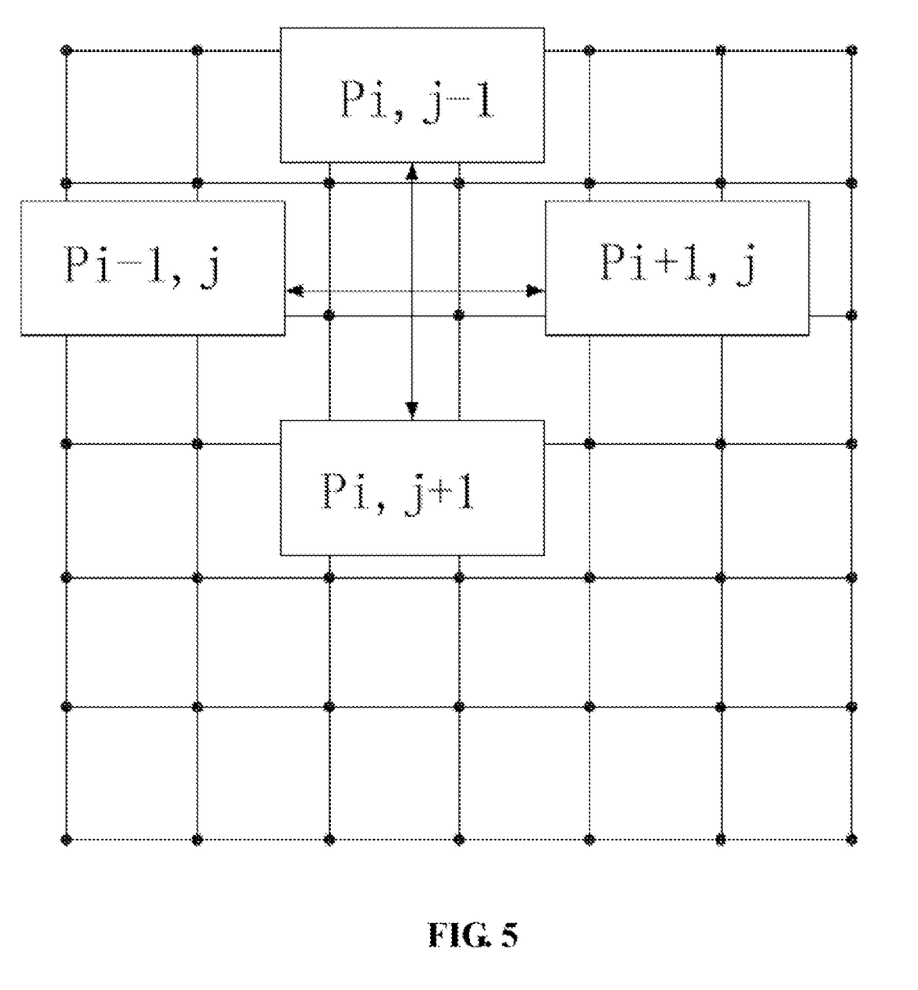
FIG. 5 is an amplified diagram of a digital image.

The driving module 112 is configured for driving the light-emitting device 4 to emit light, and controlling the CCD 3 to capture a digital image of the object 5 at each luminance value of the light-emitting device 4. As shown in FIG. 5, an amplified diagram of a digital image that is made up of plurality of points is provided. It is noted that each point in the digital image has a luminance value.

The computing module 113 is configured for computing a definition value for each captured digital image and generating a new definition curve in the model definition curve chart according to the computed definition values.

One embodiment of a method for computing a definition value G for each captured digital image is described as followed: (1) The computing module 113 reads random four points that are nearest to each other (referring to FIG. 5). (2) The computing module 113 calculates an area S of the captured digital image. (3) The computing module 113 reads four luminance values $P_{i,j-1}$, $P_{i,j+1}$, $P_{i-1,j}$ and $P_{i+1,j}$ of the four points from the captured digital image as mentioned above. (4) Using the formula:

$$G = \frac{\sum_{i=1,j=1}^{n} (Abs(P_{i,j-1} - P_{i-1,j}) + Abs(P_{i-1,j} - P_{i+1,j}))}{S},$$

wherein "Abs" is an absolute value function. The function G is a formula for computing definition value of each captured digital image.

The deviation determining module 114 is configured for determining if an ordinate deviation corresponding to each abscissa value between the new definition curve and the model definition curve falls within an allowable deviation range. In one embodiment, the allowable deviation range is about 5%.

Figure 6:
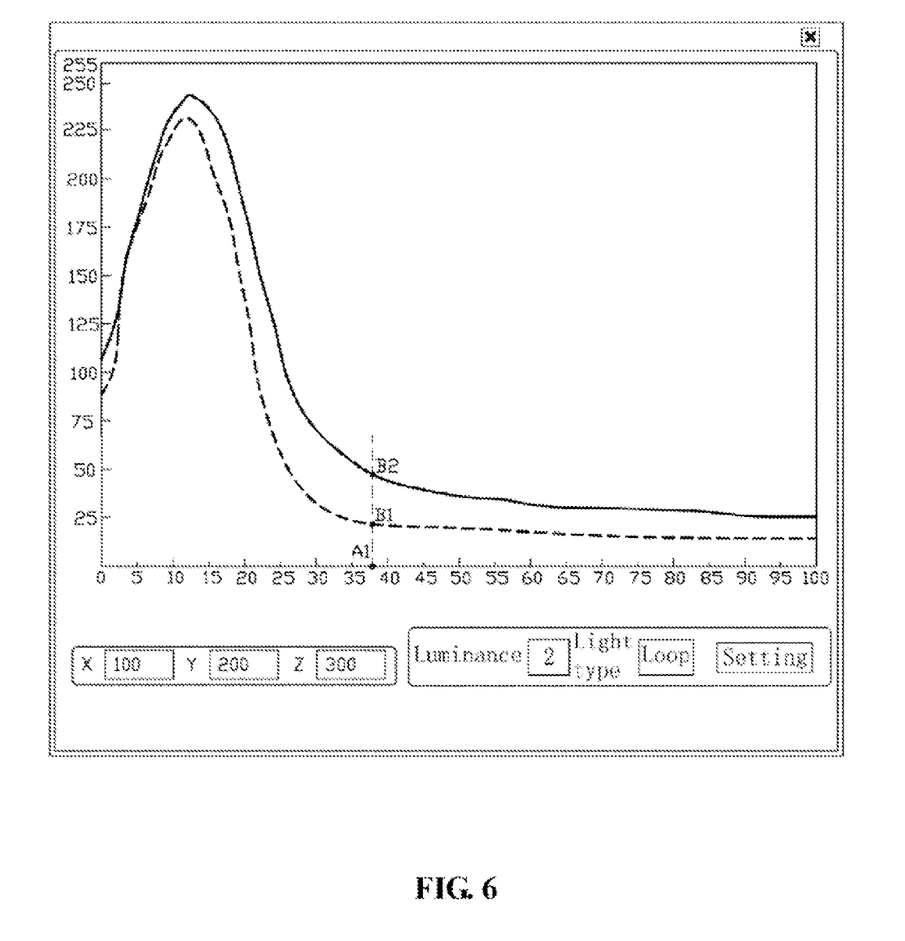
FIG. 6 illustrates one embodiment of a model definition curve chart which includes the model definition curve and a new definition curve.

One embodiment of a method for computing ordinate deviation D is described as followed: (1) Selecting an abscissa value A1 from the coordinate system in the model definition curve chart. (2) Obtaining an ordinate value B1 of the new definition curve and an ordinate value B2 of the model definition curve (referring to FIG. 6). (3) Using the formula: D=Abs(B2−B1)/B2, wherein "Abs" is an absolute value function. The function D is a formula for computing the ordinate deviation corresponding to each abscissa value between the new definition curve and the model definition curve.

The adjusting module 115 is configured for adjusting a resistance of the light-emitting device 4 so as to ensure the ordinate deviation corresponding to each abscissa value between the new definition curve and the model definition curve falls in the allowable deviation range.

Figure 3:
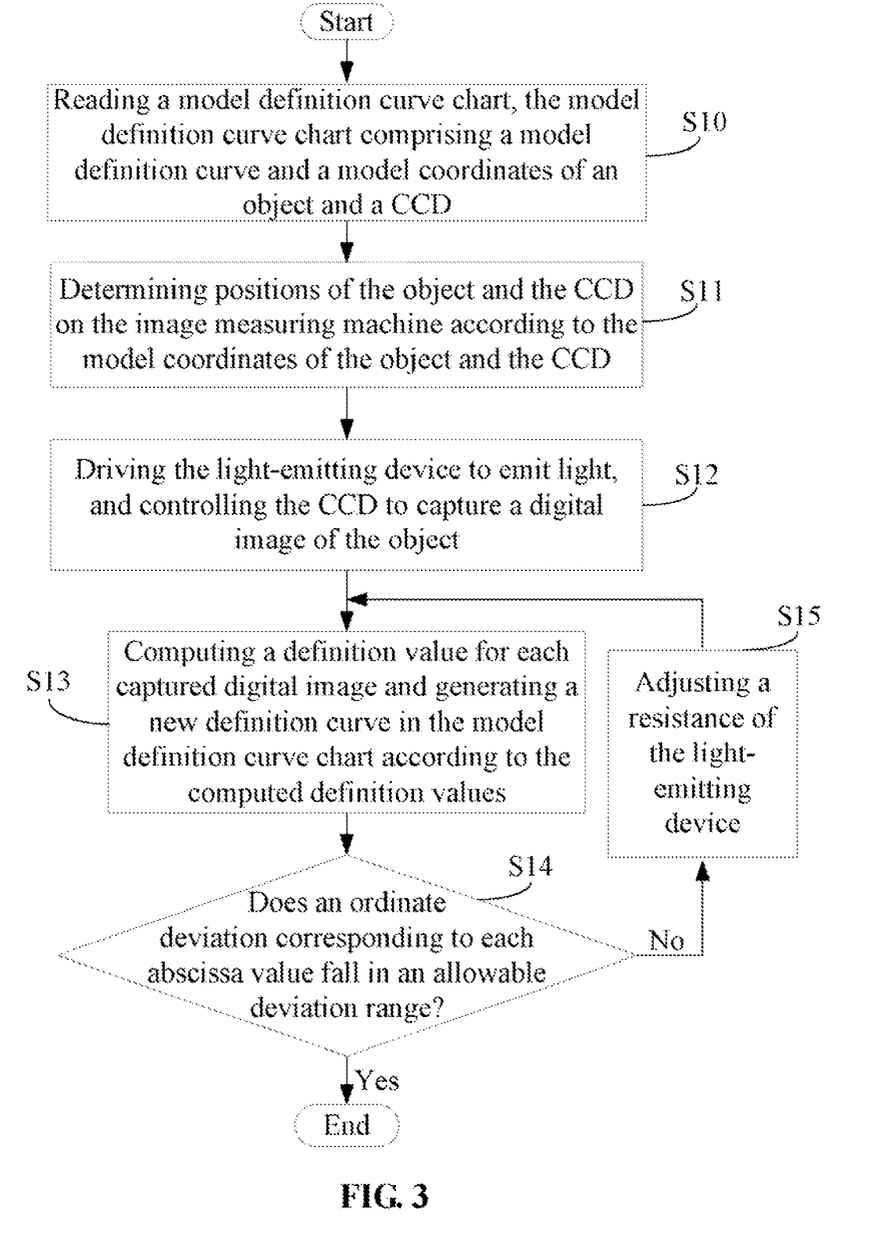
FIG. 3 is a flowchart of one embodiment of a method for adjusting luminance of a light-emitting device on an image measuring machine.

FIG. 3 is a flowchart of one embodiment of a method for adjusting luminance of a light-emitting device 4 on an image measuring machine 2. In block S10, the reading module 110 reads a model definition curve chart of the light-emitting device 4, and displays the model definition curve chart on the monitor (not shown in FIG. 1) of the computer 1. As shown in FIG. 4, the model definition curve chart comprises a coordinate system and model coordinates of the object 5 and the CCD 3 on the image measuring machine 2. The coordinate system contains a model definition curve.

In block S11, the positioning module 111 determines positions of the object 5 and the CCD 3 on the image measuring machine 2 according to the model coordinates of the object 5 and the CCD 3.

In block S12, driving module 112 drives the light-emitting device 4 to emit light, and controls the CCD 3 to capture a digital image of the object 5 at each luminance value of the light-emitting device 4. As shown in FIG. 5, an amplified diagram of a digital image that is made up of plurality of points is provided. It is noted that each point in the digital image has a luminance value.

In block S13, computing module 113 computes a definition value for each the captured digital image and generates a new definition curve in the model definition curve chart according to the computed definition values.

One embodiment of a method for computing a definition value G for each captured digital image is described as followed: (1) The computing module 113 reads four points that are nearest to each other(referring to FIG. 5). (2) The computing module 113 calculates an area S of the captured digital image. (3) The computing module 113 reads four luminance values $P_{i,j-1}$, $P_{i,j+1}$, $P_{i-1,j}$ and $P_{i+1,j}$ of the four points from the captured digital image as mentioned above. (4) Using the function G as mentioned above, a definition value of each captured digital image is computed.

In block S14, the deviation determining module 114 determines if an ordinate deviation corresponding to each abscissa value between the new definition curve and the model definition curve falls in an allowable deviation range. In one embodiment, the allowable deviation range is about 5%.

One embodiment of a method for computing ordinate deviation D is described as followed: (1) Selecting an abscissa value A1 from the coordinate system in the model definition curve chart. (2) Obtaining an ordinate value B1 of the new definition curve and an ordinate value B2 of the model definition curve (referring to FIG. 6). (3) Using the formula D as mentioned above, an ordinate deviation is computed.

If an ordinate deviation corresponding to each abscissa value between the new definition curve and the model definition curve in the model definition curve chart does not falls in the allowable deviation, the procedure ends. Otherwise, in block S15, the adjusting module 115 adjusts a resistance of the light-emitting device 4 to ensure the ordinate deviation falls in the allowable deviation range.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A system for adjusting luminance of a light-emitting device on an image measuring machine, the system comprising:
   a reading module configured for reading a model definition curve chart of the light-emitting device, the model definition curve chart comprising a coordinate system containing a model definition curve, and model coordinates of an object and a charge coupled device (CCD) on the image measuring machine;
   a position determining module configured for determining positions of the object and the CCD on the image measuring machine according to the model coordinates of the object and the CCD, so as to locate the object and the CCD to positions on the image measuring machine;
   a driving module configured for driving the light-emitting device to emit light, and controlling the CCD to capture a digital image of the object of at each luminance value of the light-emitting device;
   a computing module configured for computing a definition value for each captured digital image and generating a new definition curve in the model definition curve chart according to the computed definition values;
   a deviation determining module configured for determining if an ordinate deviation corresponding to each abscissa value between the new definition curve and the model definition curve in the model definition curve chart falls in an allowable deviation range;
   an adjusting module configured for adjusting a resistance of the light-emitting device to ensure the ordinate deviation falls in the allowable deviation range; and
   at least one processor for executing the reading module, the position determining module, the driving module, the computing module, the deviation determining module and the adjusting module.

2. The system of claim 1, wherein the light-emitting device is a laser.

3. The system of claim 1, wherein the allowable deviation range is about 5%.

4. A computer-based method for adjusting luminance of a light-emitting device on an image measuring machine, the method comprising:
   reading a model definition curve chart of the light-emitting device, the model definition curve chart comprising a coordinate system containing a model definition curve, and model coordinates of an object and a charge coupled device (CCD) on the image measuring machine;
   determining positions of the object and the CCD on the image measuring machine according to the model coordinates of the object and the CCD, so as to locate the object and the CCD to positions on the image measuring machine;
   driving the light-emitting device to emit light, and controlling the CCD to capture a digital image of the object at each luminance value of the light-emitting device;
   computing a definition value for each captured digital image and generating a new definition curve in the model definition curve chart according to the computed definition values; and
   adjusting a resistance of the light-emitting device to ensure an ordinate deviation corresponding to each abscissa value between the new definition curve and the model definition curve falls in an allowable deviation range.

5. The method of claim 4, wherein the light-emitting device is a laser.

6. The method of claim 4, wherein the allowable deviation range is about 5%.

7. The method of claim 4, wherein the block of computing the definition value for each captured digital image comprises:
   (a) selecting four nearest points of the captured digital image;
   (b) calculating an area S of the captured digital image;
   (c) reading four luminance values $P_{i,j-1}$, $P_{i,j+1}$, $P_{i-1,j}$ and $P_{i+1,j}$ of the four points from the captured digital image;
   repeating blocks (a)-(c) until the luminance values of all the points of the captured digital image are read; and
   (d) computing a definition value G of the captured digital image according to the luminance values of all points and the area S of the captured digital image.

8. The method of claim 7, wherein the definition value G is computed as follows:

$$G = \frac{\sum_{i=1,j=1}^{n} (\text{Abs}(P_{i,j-1} - P_{i-1,j}) + \text{Abs}(P_{i-1,j} - P_{i+1,j}))}{S},$$

wherein "Abs" is an absolute value function.

9. The method of claim 4, wherein computing ordinate deviation comprises:
   selecting an abscissa value A1 from the model definition curve chart;
   obtaining an ordinate value B1 of the new definition curve and an ordinate value B2 of the model definition curve according to the abscissa value A1; and
   computing the ordinate deviation D according to the value B1 and B2.

10. The method of claim 9, wherein the ordinate deviation D is computed as follows:

$$D = \text{Abs}(B1 - B2)/B1,$$

wherein "Abs" is an absolute value function.

11. A non-transitory computer-readable medium having stored thereon instructions for that, when executed by a computer, causing the computer to perform a method for adjusting luminance of a light-emitting device on an image measuring machine, the method comprising: reading a model definition curve chart of the light-emitting device, the model definition curve chart comprising a coordinate system containing a model definition curve, and model coordinates of an object and a charge coupled device (CCD) on the image measuring machine; determining positions of the object and the CCD on the image measuring machine according to the model coordinates of the object and the CCD, so as to locate the object and the CCD to positions on the image measuring machine; driving the light-emitting device to emit light, and controlling the CCD to capture a digital image of the object at each luminance value of the light-emitting device; computing a definition value for each captured digital image and generating a new definition curve in the model definition curve chart according to the computed definition values; and adjusting a resistance of the light-emitting device to ensure an ordinate deviation corresponding to each abscissa value between the new definition curve and the model definition curve falls in an allowable deviation range.

12. The medium of claim 11, wherein the light-emitting is a laser.

13. The medium of claim 11, wherein the allowable deviation range is about 5%.

14. The medium of claim 11, wherein the block of computing a definition value for each captured digital image comprises:

(a) selecting four nearest points of the captured digital image;
(b) calculating an area S of the captured digital image;
(c) reading four luminance values $P_{i,j-1}$, $P_{i,j+1}$, $P_{i-1,j}$ and $P_{i+1,j}$ of the four points from the captured digital image; repeating blocks (a)-(c) until the luminance values of all the points of the captured digital image are read; and
(d) computing a definition value G of the captured digital image according to the luminance values of all points and the area S of the captured digital image.

15. The medium of claim 14, wherein the definition value G is computed as follows:

$$G = \frac{\sum_{i=1,j=1}^{n}(\text{Abs}(P_{i,j-1}-P_{i-1,j})+\text{Abs}(P_{i-1,j}-P_{i+1,j}))}{S},$$

wherein "Abs" is an absolute value function.

16. The medium of claim 11, wherein computing the ordinate deviation comprises:

selecting an abscissa value A1 from the model definition curve chart;

obtaining an ordinate value B1 of the new definition curve and an ordinate value B2 of the model definition curve according to the abscissa value A1; and computing the ordinate deviation D according to the value B1 and B2.

17. The medium of claim 16, wherein the ordinate deviation D is computed as follows:

$$D=\text{Abs}(B2-B1)/B2,$$

wherein "Abs" is an absolute value function.

* * * * *